(12) United States Patent
Otaka

(10) Patent No.: US 11,096,110 B2
(45) Date of Patent: Aug. 17, 2021

(54) COMMUNICATION SYSTEM, WIRELESS BASE STATION, COMPUTER-READABLE STORAGE MEDIUM, METHOD, AND MANAGEMENT APPARATUS

(71) Applicant: HONDA MOTOR CO., LTD., Tokyo (JP)

(72) Inventor: Masaru Otaka, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/886,801

(22) Filed: May 29, 2020

(65) Prior Publication Data
US 2020/0389834 A1 Dec. 10, 2020

(30) Foreign Application Priority Data
Jun. 4, 2019 (JP) .............................. JP2019-104876

(51) Int. Cl.
*H04W 48/04* (2009.01)
*H04W 48/10* (2009.01)
*H04W 48/16* (2009.01)

(52) U.S. Cl.
CPC ........... *H04W 48/04* (2013.01); *H04W 48/10* (2013.01); *H04W 48/16* (2013.01)

(58) Field of Classification Search
CPC ..... H04W 48/00; H04W 48/02; H04W 48/04; H04W 48/08; H04W 48/10; H04W 48/16; H04W 48/18; H04W 48/20
See application file for complete search history.

(56) References Cited

U.S. PATENT DOCUMENTS

| 9,002,343 | B2* | 4/2015 | Harrigan | H04W 4/029 455/419 |
| 9,113,321 | B1* | 8/2015 | Wojcik | H04W 4/14 |
| 2002/0107032 | A1* | 8/2002 | Agness | H04B 1/3805 455/456.6 |
| 2003/0157923 | A1* | 8/2003 | Tani | H04W 76/50 455/404.1 |
| 2007/0036322 | A1* | 2/2007 | Goldman | H04M 3/42102 379/211.02 |
| 2007/0238454 | A1* | 10/2007 | Chambers | H04W 68/00 455/422.1 |
| 2011/0021221 | A1 | 1/2011 | Kondo | |

(Continued)

FOREIGN PATENT DOCUMENTS

JP 2011029988 A 2/2011

*Primary Examiner* — Siu M Lee

(57) ABSTRACT

Provided is a communication system comprising a wireless base station and a communication apparatus capable of wirelessly communicating with the wireless base station. The wireless base station comprises a regulatory-signal informing unit that informs the communication apparatus of type information indicating a type of the communication apparatus and a regulatory signal for restricting transmission to the wireless base station, in response to a predetermined condition being satisfied. The communication apparatus comprises a communication-controlling unit that restricts transmission to the wireless base station based on the regulatory signal, when the type of the communication apparatus and the type indicated by the type information are matched.

14 Claims, 8 Drawing Sheets

(56) References Cited

U.S. PATENT DOCUMENTS

2015/0181403 A1\* 6/2015 Tanaka ................. H04W 48/06
 455/404.1
2017/0006522 A1\* 1/2017 Nishimura ............ H04W 8/186
2019/0394629 A1\* 12/2019 Otaka .................... H04W 4/90

\* cited by examiner

| TYPE<br>CONDITION | VIBRATION SENSOR | CAMERA | SMART METER | ... |
|---|---|---|---|---|
| EARTHQUAKE | O | × | × | ... |
| TRAFFIC ACCIDENT | × | O | × | ... |
| TSUNAMI | × | O | × | ... |
| TERRORIST ATTACK | × | O | × | ... |
| ... | ... | ... | ... | ... |

COMMUNICATION SYSTEM, WIRELESS BASE STATION, COMPUTER-READABLE STORAGE MEDIUM, METHOD, AND MANAGEMENT APPARATUS

The contents of the following Japanese patent application are incorporated herein by reference: NO. 2019-104876 filed in JP on Jun. 4, 2019

BACKGROUND

1. Technical Field

The present invention relates to a communication system, a wireless base station, a computer-readable storage medium, a method, and a management apparatus.

2. Related Art

A technique for specifying a communication terminal, based on its number, on which regulations of communication are to be imposed in case of disaster has been known (for example, refer to Patent Literature 1).

PRIOR ART LITERATURE

Patent Literature

[Patent Literature 1] Japanese Unexamined Patent Application Publication No. 2011-029988

SUMMARY

Technical Problem

Preferably, provided is a technique capable of regulating communication of a specific type of communication terminal depending on a situation.

BRIEF DESCRIPTION OF THE DRAWINGS

FIG. 2 schematically illustrates an example of a to-be-regulated-item table 150.

DESCRIPTION OF EXEMPLARY EMBODIMENTS

The following describes the present invention through embodiments of the invention, and the below described embodiments do not limit the scope of the invention according to the claims. In addition, not all combinations of features described in the embodiments are necessarily essential to the solution of the invention.

Figure 1:
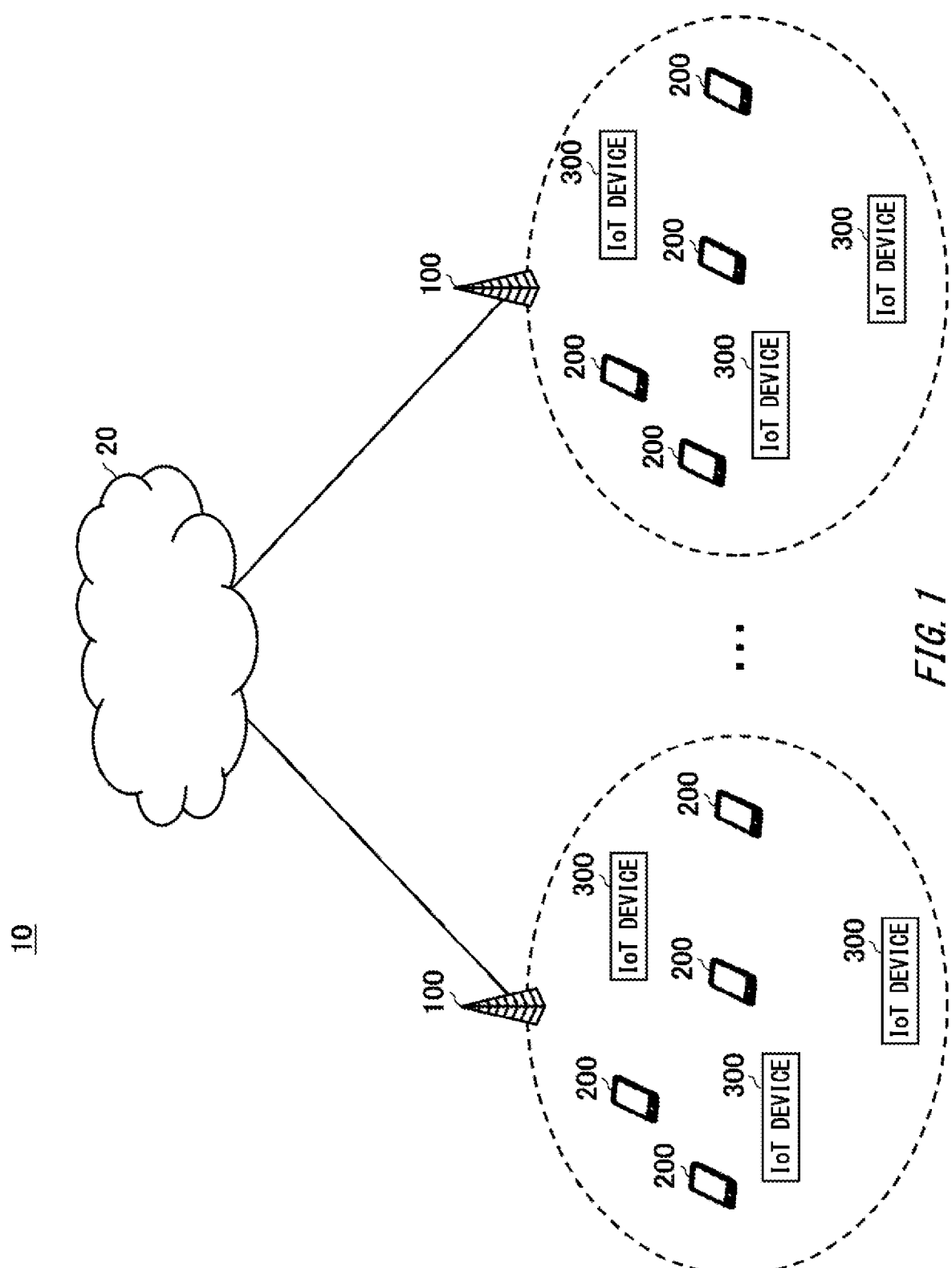
FIG. 1 schematically illustrates an example of a communication system 10.

FIG. 1 schematically illustrates an example of a communication system 10. The communication system 10 includes a wireless base station 100 and an IoT device 300.

The wireless base station 100 establish a wireless communication connection with a communication terminal 200 or the IoT device 300, to wirelessly communicate with the communication terminal 200 or the IoT device 300. The wireless base station 100 relays communication between the communication terminal 200 or the IoT device 300 and a network 20. The network 20 includes a mobile communication network. The network 20 may also include the internet.

The wireless base station 100 may comply with any mobile communication method. The wireless base station 100 complies with, for example, the 3G (3rd Generation) communication method. The wireless base station 100 complies with, for example, the LTE (Long Term Evolution) communication method. The wireless base station 100 may be an eNB (eNodeB). The wireless base station 100 also complies with, for example, the 5G (5th Generation) communication method. The wireless base station 100 may be a gNB (gNodeB). The wireless base station 100 may comply with a mobile communication method that is the 6G (6th Generation) communication method and beyond.

In this embodiment, the communication terminal 200 may be a terminal manipulated for transmission by user's intention. The communication terminal 200 is, for example, a mobile phone such as a smartphone.

In this embodiment, the IoT device 300 may be devices that are installed in various places and that transmit collected information to the wireless base station 100 according to a predetermined transmission schedule. The IoT device 300 may be a device without a user interface for starting transmission to the wireless base station 100. The IoT device 300 includes, as its examples, various types of devices, for example, sensors such as a vibration sensor, a light sensor, and a temperature sensor, a camera, a smart meter, and the like.

Various types of communication apparatuses, such as the communication terminal 200 and various types of IoT devices 300, can be camped on the wireless base station 100. To be camped on the wireless base station 100 may be to establish a wireless communication connection with the wireless base station 100. Then, the wireless base station 100 can relay communication of various types of communication apparatuses.

The communication system 10 or the wireless base station 100 according to this embodiment has a function for regulating communication of a specific type of communication apparatus, in response to a predetermined condition being satisfied. For example, the wireless base station 100 regulates communication of the IoT device 300, in response to occurrence of a disaster such as an earthquake. This can prevent communication of the communication terminal 200 manipulated for transmission by user's intention from being suppressed by communication of a device such as a IoT device 300 that performs communication independent of user's intention even in case of disaster.

For example, in response to the predetermined condition being satisfied, the wireless base station 100 inform the communication apparatus of a regulatory signal for restricting transmission to the wireless base station 100 and type information that indicates a type of a to-be-regulated communication apparatus. The regulatory signal may be a signal for prohibiting information from transmitting to the wireless base station 100. The regulatory signal may also a signal for reducing a transmission amount of information to the wireless base station 100. For example, the regulatory signal is a signal for reducing an information-transmitting frequency to the wireless base station 100.

The wireless base station 100 may inform a plurality of communication apparatuses of the regulatory signal and the type information, by including the regulatory signal and the type information in broadcasting information periodically transmitted. The broadcasting information typically includes PLMN (Public land mobile network), a band number, a cell ID, a wireless-related parameter, an emergency earthquake alert, and the like. The wireless base station 100 according to this embodiment, however, can transmit broadcasting information to which the regulatory signal and the type information are further added, in response to the predetermined condition being satisfied.

When the wireless base station 100 complies with the LTE communication method, the wireless base station 100 includes the regulatory signal and the type information in an SIB (System Information Block), for example.

When the wireless base station 100 complies with the 5G communication method, the wireless base station 100 includes the regulatory signal and the type information in OSI (Other System Information), for example. The wireless base station 100 may include the regulatory signal and the type information in MSI (Minimum System Information).

The type information may be information that indicates a type based on a function of the communication apparatus. For example, the type information includes information indicating whether a communication apparatus corresponds to that having a function to automatically transmit collected information, according to a predetermined transmission schedule. By regulating communication of such type of communication apparatus, communication of the communication apparatus performing communication independent of user's intention even in case of disaster can prevent communication of the communication terminal 200 manipulated for transmission by user's intention from being suppressed.

The type information may also indicate a communication apparatus having an information-storing unit for storing information, when a communication apparatus has a function to automatically transmit collected information according to a predetermined transmission schedule and is not capable of transmitting the information to the wireless base station 100. This can identify a communication apparatus, even if information transmission to the wireless base station 100 is temporarily regulated, capable of storing information during the regulated period, and regulate communication, so that reducing adverse effects due to regulation of communication is possible. For example, the type information also indicates a communication apparatus without a user interface for starting transmission to the wireless base station 100.

The type information may be information indicating a specific electronic device. The specific electronic device may be a device having a function to automatically transmit collected information according to a predetermined transmission schedule. The specific electronic device may be a device without a user interface for starting transmission to the wireless base station 100.

The type information may indicate the IoT device 300. The type information may also further indicate type of the IoT device 300. For example, the type information indicates sensors, a camera, a smart meter, and the like. The type information may further indicate a type of the sensors. For example, the type information indicates a vibration sensor, a light sensor a temperature sensor, and the like.

The predetermined condition is satisfied, for example, when a disaster occurs. The predetermined condition may also be satisfied when a traffic accident occurs. The predetermined condition may also be satisfied when a terrorist attack occurs. The predetermined condition may be settable arbitrarily.

In response to any of a plurality of conditions being satisfied, the wireless base station 100 may inform the communication apparatus of the type information indicating a type of the communication apparatus corresponding to the satisfied condition and the regulatory signal. The wireless base station 100 may prestore a to-be-regulated-item table 150 in which whether communication is regulated relative to the condition and the type of the communication apparatus is registered, and determine the type information that indicates a type of the communication apparatus corresponding to the satisfied condition by referring the to-be-regulated-item table 150.

FIG. 2 schematically illustrates an example of the to-be-regulated-item table 150. The to-be-regulated-item table 150 illustrated in FIG. 2 shows a vibration sensor, a camera, and a smart meter as examples of types of the communication apparatus, and shows an earthquake, a traffic accident, a tsunami, and a terrorist attack as examples of conditions. The types and conditions are not limited to these examples, and may be arbitrarily registered. These conditions may also be set each for a plurality of phases relative to a condition. For example, the earthquake information may have plural types of conditions depending on the seismic intensity that has occurred (or is estimated to occur), and may further have a plurality of phases chronologically, such as before, during, immediately after an earthquake occurrence, an elapse of predetermined time after the occurrence, an elapse of predetermined days after the occurrence. For shifting from a phase to other phase, for example, a condition-determining unit 132 in the wireless base station 100 or a condition-determining unit 404 in a management apparatus 400 described below may perform the transition.

In the to-be-regulated-item table 150 illustrated in FIG. 2, depending on each condition, an object that communication is to be regulated is represented with a "crossing symbol", and an object that communication is not to be regulated is represented with a "circular symbol". According to the to-be-regulated-item table 150 exemplified in FIG. 2, when an earthquake occurs, the wireless base station 100 does not regulate communication with the vibration sensor, and regulates communication with the camera and the smart meter. In addition, when any of a traffic accident, a tsunami, and a terrorist attack occurs, the wireless base station 100 does not regulate communication with the camera, and regulates communication with the vibration sensor and the smart meter. When the to-be-regulated-item table 150 has a plurality of tables, communication with the smart meter is released after an elapse of predetermined time (days), but communication with the camera may remain regulated due to its relatively high communication traffic. In this way, conditions for regulating communication may be set suitably in advance, accordingly.

In this way, by registering in advance whether communication is regulated relative to any combination between types of the communication apparatus and conditions, depending on a satisfied condition, an IoT device 300 for which it is preferable not to regulate communication can be prevented from communication being regulated.

Figure 3:
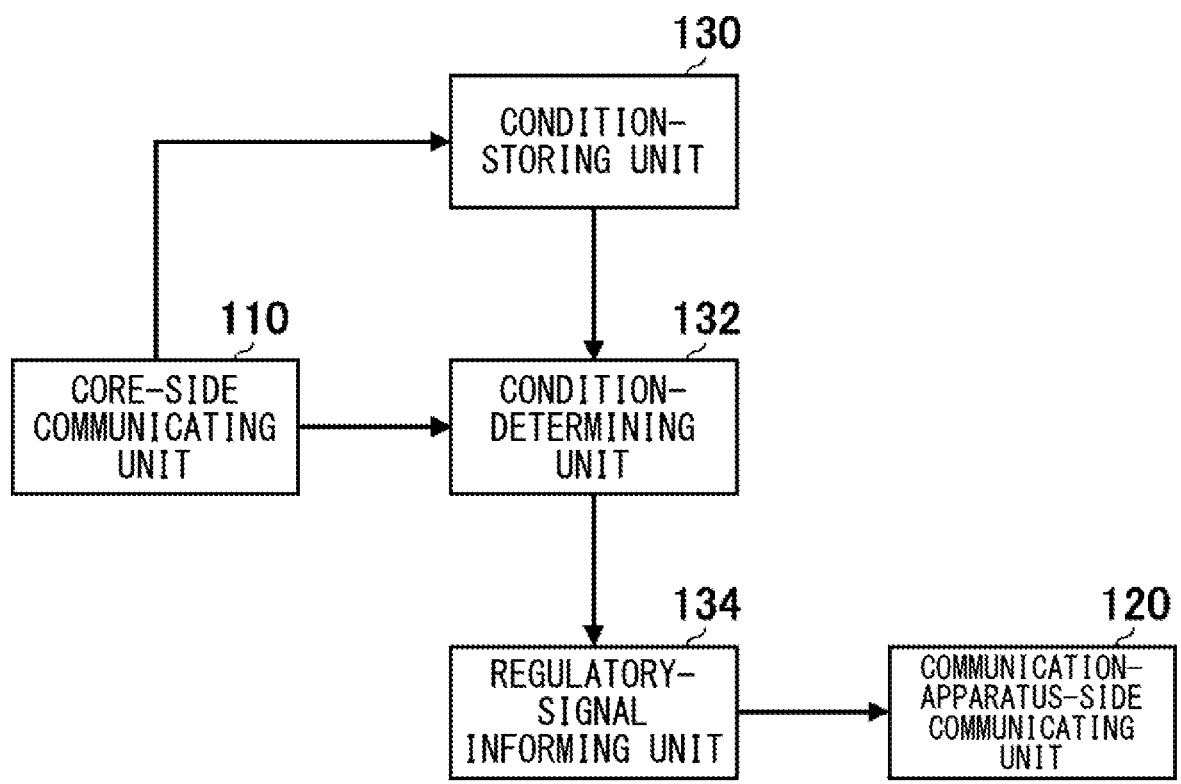
FIG. 3 schematically illustrates an example of a functional configuration of a wireless base station 100.

FIG. 3 schematically illustrates an example of a functional configuration of the wireless base station 100. The wireless base station 100 includes a core-side communicating unit 110, a communication-apparatus-side communicating unit 120, a condition-storing unit 130, a condition-determining unit 132, and a regulatory-signal informing unit 134.

The core-side communicating unit 110 communicates with the network 20. The communication-apparatus-side communicating unit 120 establishes a wireless communication connection with the communication apparatus to communicate with the communication apparatus.

The condition-storing unit 130 stores a condition registered as the condition for informing a regulatory signal when the condition is satisfied. The condition-storing unit 130 stores, for example, a condition received from an apparatus arranged in the core network of a mobile communication network in the network 20. The condition-storing unit 130 also stores, for example, a condition received from an apparatus connected to the internet in the network 20. The condition-storing unit 130 may store a condition registered by an operator of the wireless base station 100. The condition-storing unit 130 may store the to-be-regulated-item table 150 in which whether to regulate communication is registered relative to each combination between a plurality of conditions and types of a plurality of communication apparatuses.

The condition-determining unit 132 determines whether the condition stored in the condition-storing unit 130 is satisfied. The condition-determining unit 132 may determine whether at least any of a plurality of conditions stored in the condition-storing unit 130 is satisfied.

The condition-determining unit 132 determines that the condition is satisfied, for example, when a disaster such as an earthquake and a tsunami occurs. The condition-determining unit 132 determines that the condition is satisfied, for example, when acquiring an emergency earthquake alert, a tsunami warning, and the like issued by the Meteorological Agency. In addition, the condition-determining unit 132 may determine the condition based on information from a seismic intensity meter provided in the wireless base station 100. The condition-determining unit 132 may determine that the condition is satisfied, when acquiring a tsunami advisory, a tsunami warning, a massive tsunami warning, and the like issued by the ministries and agencies and local public entities. The condition-determining unit 132 may determine that the condition is satisfied, when being aware that an earthquake or a tsunami has occurred by any other method.

The condition-determining unit 132 may determine that the condition is satisfied, when a weather phenomenon such as a heavy rain, a stormy wind, a high wave, a severe snowstorm, and a heavy snow occurs. The condition-determining unit 132 determines that the condition is satisfied, for example, when acquiring a special warning, about a weather condition and so on, issued by the Meteorological Agency. Alternatively, the condition-determining unit 132 may determine the condition based on information from observational equipment provided in the wireless base station 100. The condition-determining unit 132 may determine that the condition is satisfied, when being aware that these weather phenomena have occurred by any other method.

The condition-determining unit 132 may determine that the condition is satisfied, when a terrorist attack occurs. The condition-determining unit 132 determines that the condition is satisfied, for example, when acquiring large-scale terrorism information and so on issued by ministries and agencies and local public entities. The condition-determining unit 132 may determine that the condition is satisfied, when being aware that a terrorist attack has occurred by any other method.

The condition-determining unit 132 may determine that the condition is satisfied, when a traffic accident has occurred. The condition-determining unit 132 determines that the condition is satisfied, for example, when receiving information that indicates a traffic accident has occurred from a traffic information server on the internet, which provides traffic information. The condition-determining unit 132 may determine that the condition is satisfied, when being aware that a traffic accident has occurred by any other method.

When it is determined by the condition-determining unit 132 that the condition is satisfied, the regulatory-signal informing unit 134 informs, of the communication apparatus, type information indicating a type of the communication apparatus and a restriction signal for restricting transmission to the wireless base station 100. The regulatory-signal informing unit 134 may inform of the communication apparatus the type information and the regulatory signal, by including the type information and the regulatory signal in broadcasting information that the wireless base station 100 transmits periodically. The communication apparatus restricts transmission to the wireless base station 100 based on the regulatory signal, when the type of the communication apparatus and the type indicated by the type information are matched.

In response to any of a plurality of conditions stored in the condition-storing unit 130 being satisfied, the regulatory-signal informing unit 134 may inform of the communication apparatus the type information that indicates the type of the communication apparatus corresponding to the satisfied condition and the regulatory signal. The regulatory-signal informing unit 134 may identify type information corresponding to the satisfied condition, by referring the to-be-regulated-item table 150 stored in the condition-storing unit 130.

The regulatory-signal informing unit 134 may inform the communication apparatus of the type information, the regulatory signal, and area information indicating an area in which transmission to the wireless base station 100 is to be restricted. For example, when an area in which a disaster or the like has occurred is a part of the coverage area of the wireless base station 100, the regulatory-signal informing unit 134 may inform the communication apparatus of the area information indicating the part of the area, the type information and the regulatory signal. The communication apparatus may restrict transmission to the wireless base station 100 based on the regulatory signal, when the type of the communication apparatus and the type indicated by the type information are matched, and when the communication apparatus is located in the area indicated by the area information.

Figure 4:
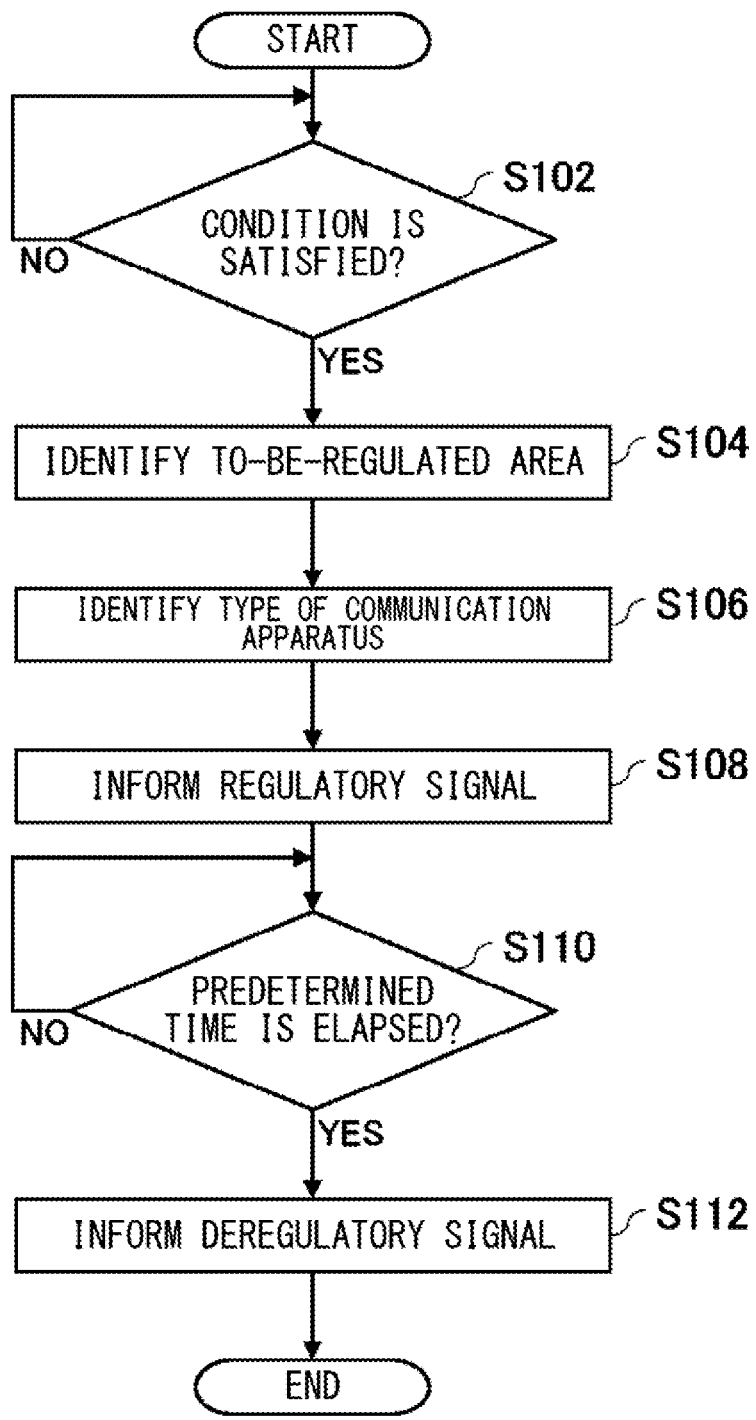
FIG. 4 schematically illustrates an example of a process flow performed by the wireless base station 100.

FIG. 4 schematically illustrates an example of a process flow by the wireless base station 100. Here, the process flow by the wireless base station 100 is illustrated in case that any of a plurality of conditions stored in the condition-storing unit 130 is satisfied.

At step (the step may be set forth abbreviated as "S") 102, the condition-determining unit 132 determines whether any of the plurality of conditions stored in the condition-storing unit 130 is satisfied. If yes, then proceed to S104.

At S104, the regulatory-signal informing unit 134 identifies a target area in which transmission of the IoT device 300 to the wireless base station 100 is to be restricted. At S106, the regulatory-signal informing unit 134 identifies a type of the communication apparatus on which transmission to the wireless base station 100 is to be restricted. At S108, the regulatory-signal informing unit 134 informs the communication apparatus of the area information indicating the to-be-regulated area identified at S104, the type information indicating the type of the communication apparatus identified at S106, and the regulatory signal.

At S110, the regulatory-signal informing unit 134 determines whether a predetermined time is elapsed since the regulatory signal was informed at S108. The predetermined time may be preset. The predetermined time may be set for each of the plurality of conditions. If it is determined that the predetermined time has been elapsed, then proceed to S112.

At S112, the regulatory-signal informing unit 134 informs the communication apparatus of a deregulatory signal that cancels the restriction of transmission to the wireless base station 100. The regulatory-signal informing unit 134 may inform the communication apparatus of the deregulatory signal, by including the deregulatory signal in the broadcasting information. Then, the process flow completes. In addition, the regulation may be changed by performing a process of shifting a plurality of phases.

Figure 5:
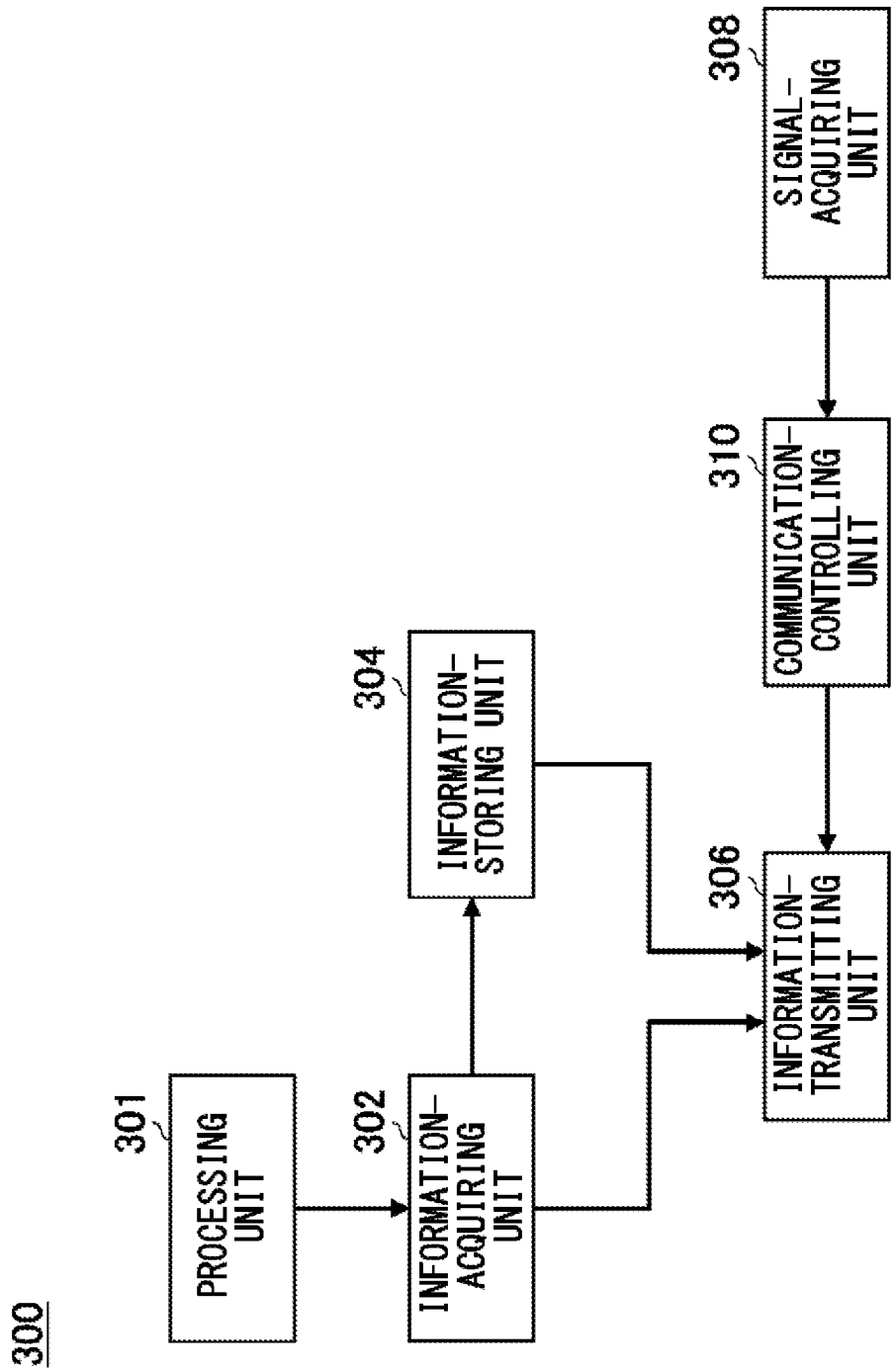
FIG. 5 schematically illustrates an example of a functional configuration of an IoT device 300.

FIG. 5 schematically illustrates an example of a functional configuration of the IoT device 300. The IoT device 300 includes a processing unit 301, an information-acquiring unit 302, an information-storing unit 304, an information-transmitting unit 306, a signal-acquiring unit 308, and a communication-controlling unit 310. The IoT device 300 may be an example of a communication processing apparatus.

The processing unit 301 processes information depending on a type of the IoT device 300. For example, when the IoT device 300 is a vibration sensor, the processing unit 301 performs a process for detecting vibration. In addition, for example, when the IoT device 300 is a monitoring camera, the processing unit 301 performs a capturing process. The processing unit 301 may process information at a predetermined time interval.

The information-acquiring unit 302 acquires various types of information. The information-acquiring unit 302 sequentially acquires a processing result of the processing unit 301, for example. For example, when the IoT device 300 is a vibration sensor, the information-acquiring unit 302 acquires a value of vibration that the processing unit 301 has detected. The information-storing unit 304 stores information acquired by the information-acquiring unit 302. In addition, when the IoT device 300 is a monitoring camera, the information-acquiring unit 302 acquires information of an image or a video captured by the processing unit 301. In other words, the processing unit 301 is a main function of the IoT device 300, and the information-acquiring unit 302 acquires information at least for transmitting to the information-transmitting unit 306 from the processing result of the processing unit 301.

The information-transmitting unit 306 transmits information acquired by the information-acquiring unit 302 to a preset destination according to a preset schedule. The information-transmitting unit 306 may transmit information acquired by the information-acquiring unit 302 to the wireless base station 100, in order to transmit the information to the preset destination. The wireless base station 100 may transmit the received information to that destination. The information-transmitting unit 306 may acquire the information, which the information-acquiring unit 302 has acquired, from the information-acquiring unit 302, and transmit the information to the preset destination according to the preset schedule. In addition, the information-transmitting unit 306 may read the information, which is suitably stored in the information-storing unit 304 and which has been acquired by the information-acquiring unit 302, from the information-storing unit 304 according to the preset schedule, and transmit the information to the preset destination.

The signal-acquiring unit 308 acquires a signal from the wireless base station 100. The signal-acquiring unit 308 acquires, for example, type information and a regulatory signal transmitted by the wireless base station 100. In addition, the signal-acquiring unit 308 acquires, for example, the type information, the regulatory signal, and area information transmitted by the wireless base station 100.

The communication-controlling unit 310 controls transmission of information by the information-transmitting unit 306. The communication-controlling unit 310 may restrict transmission by the information-transmitting unit 306 to the wireless base station 100, based on the signal acquired by the signal-acquiring unit 308. The communication-controlling unit 310 may restrict transmission to the wireless base station 100 by the information-transmitting unit 306 according to the regulatory signal, when the type indicated by the type information and the type of the IoT device 300 are matched. In addition, the communication-controlling unit 310 may restrict transmission to the wireless base station 100 by the information-transmitting unit 306 according to the regulatory signal, when the type indicated by the type information and the type of the IoT device 300 are matched and when the IoT device 300 is located in the area indicated by the area information.

The communication-controlling unit 310 may cause the information-transmitting unit 306 to transmit information to be processed by the processing unit 301 in a first time interval to the wireless base station 100 in the first time interval, when the signal-acquiring unit 308 acquires no regulatory signal. For example, the communication-controlling unit 310 prohibits the information-transmitting unit 306 from transmitting information to be processed by the processing unit 301 to the wireless base station 100, when the signal-acquiring unit 308 acquires the regulatory signal. In addition, for example, the communication-controlling unit 310 causes the information-transmitting unit 306 to transmit information to be processed by the processing unit 301 in a second time interval larger than the first time interval, when the signal-acquiring unit 308 acquires the regulatory signal.

The above embodiment has been described mainly exemplifying the example in which the wireless base station 100 determines whether the predetermined condition is satisfied, but is not limited thereto. The determination may be performed by a management apparatus or the like, connected to the network 20, managing a plurality of wireless base stations 100.

Figure 6:
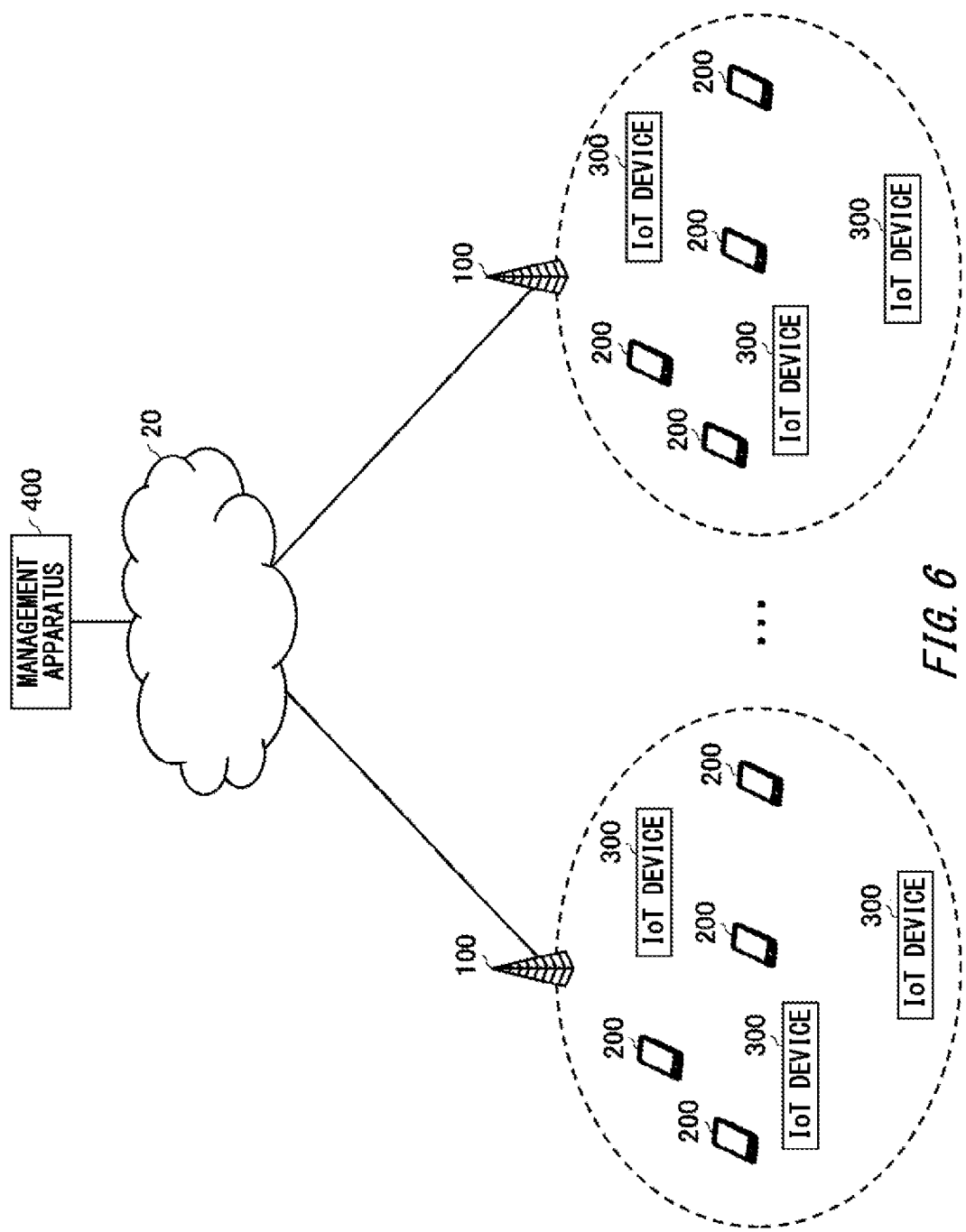
FIG. 6 schematically illustrates an example of a communication environment of a management apparatus 400.

FIG. 6 schematically illustrates an example of a communication environment of a management apparatus 400. Differences from FIG. 1 are mainly described here. The management apparatus 400 is connected to the network 20. The management apparatus 400 is arranged in a core network of the mobile communication network in the network 20, for example. In addition, the management apparatus 400 is connected to the internet in the network 20.

The management apparatus 400 manages a plurality of wireless base stations 100. When a predetermined condition is satisfied, the management apparatus 400 selects one or more wireless base stations 100 from among the plurality of wireless base stations 100 depending on the satisfied condition, and causes the one or more selected wireless base stations 100 to inform the communication apparatus, of type information indicating a type of the communication apparatus and a regulatory signal for restricting transmission to the wireless base station 100.

For example, when a condition is satisfied due to occurrence of disaster or the like, the management apparatus 400 identifies an area in which the disaster or the like has occurred, and selects one or more wireless base stations 100 covering the identified area from among a plurality of to-be-managed wireless base stations 100. This can regulate communication of the communication apparatus that is highly required to regulate communication due to occurrence of disaster or the like.

Figure 7:
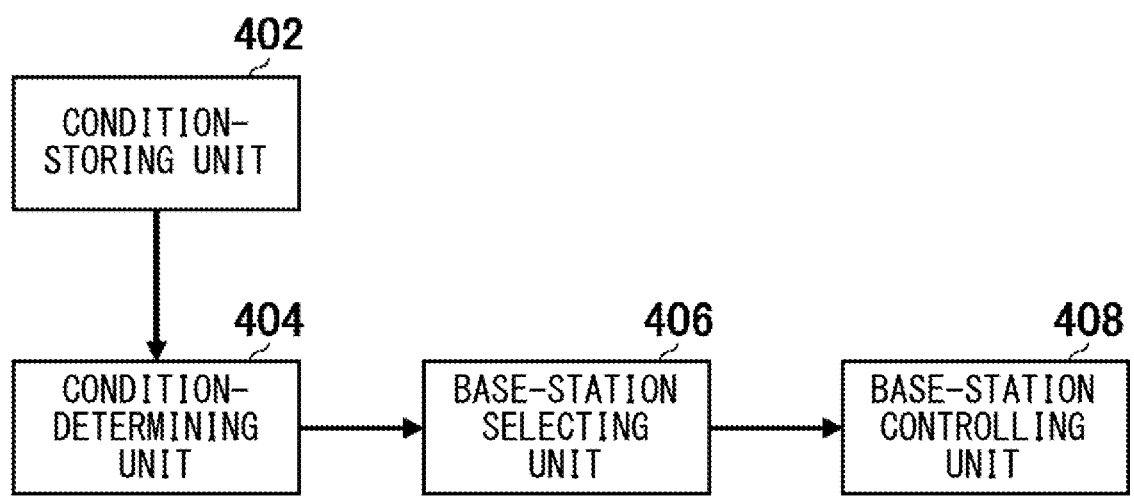
FIG. 7 schematically illustrates an example of a functional configuration of the management apparatus 400.

FIG. 7 schematically illustrates an example of a functional configuration of the management apparatus 400. The management apparatus 400 includes a condition-storing unit 402, a condition-determining unit 404, a base-station selecting unit 406, and a base-station controlling unit 408.

The condition-storing unit 402 stores a condition registered as the condition for informing a regulatory signal when the condition is satisfied. The condition-storing unit 402 stores, for example, a condition received via the network 20. In addition, the condition-storing unit 402 may store a condition registered by an operator of the management apparatus 400. The condition-storing unit 402 may store the to-be-regulated-item table 150 in which whether to regulate communication is registered relative to each combination between a plurality of conditions and types of a plurality of communication apparatuses.

The condition-determining unit 404 determines whether the condition stored in the condition-storing unit 402 is satisfied. The condition-determining unit 404 may determine whether at least any of a plurality of conditions stored in the condition-storing unit 402 is satisfied. The determination method by the condition-determining unit 404 may be similar to the determination method by the condition-determining unit 132.

The base-station selecting unit 406 selects one or more wireless base stations 100 from among a plurality of to-be-managed wireless base stations 100, when the condition-determining unit 404 determines that the condition is satisfied, depending on the satisfied condition. For example, when a condition is satisfied due to occurrence of disaster or the like, the base-station selecting unit 406 identifies an area in which the disaster or the like has occurred, and selects one or more wireless base stations 100 covering the identified area.

The base-station controlling unit 408 causes the one or more wireless base stations 100 selected by the base-station selecting unit 406 to inform the communication apparatus, of type information indicating the type of the communication apparatus and the restriction signal for restricting transmission to the wireless base stations 100. By transmitting, to the one or more wireless base stations 100 selected by the base-station selecting unit 406, an indication for including the type information and the restriction signal into the broadcasting information, the base-station controlling unit 408 may cause the one or more wireless base stations 100 to inform the communication apparatus of the type information and the restriction signal.

Figure 8:
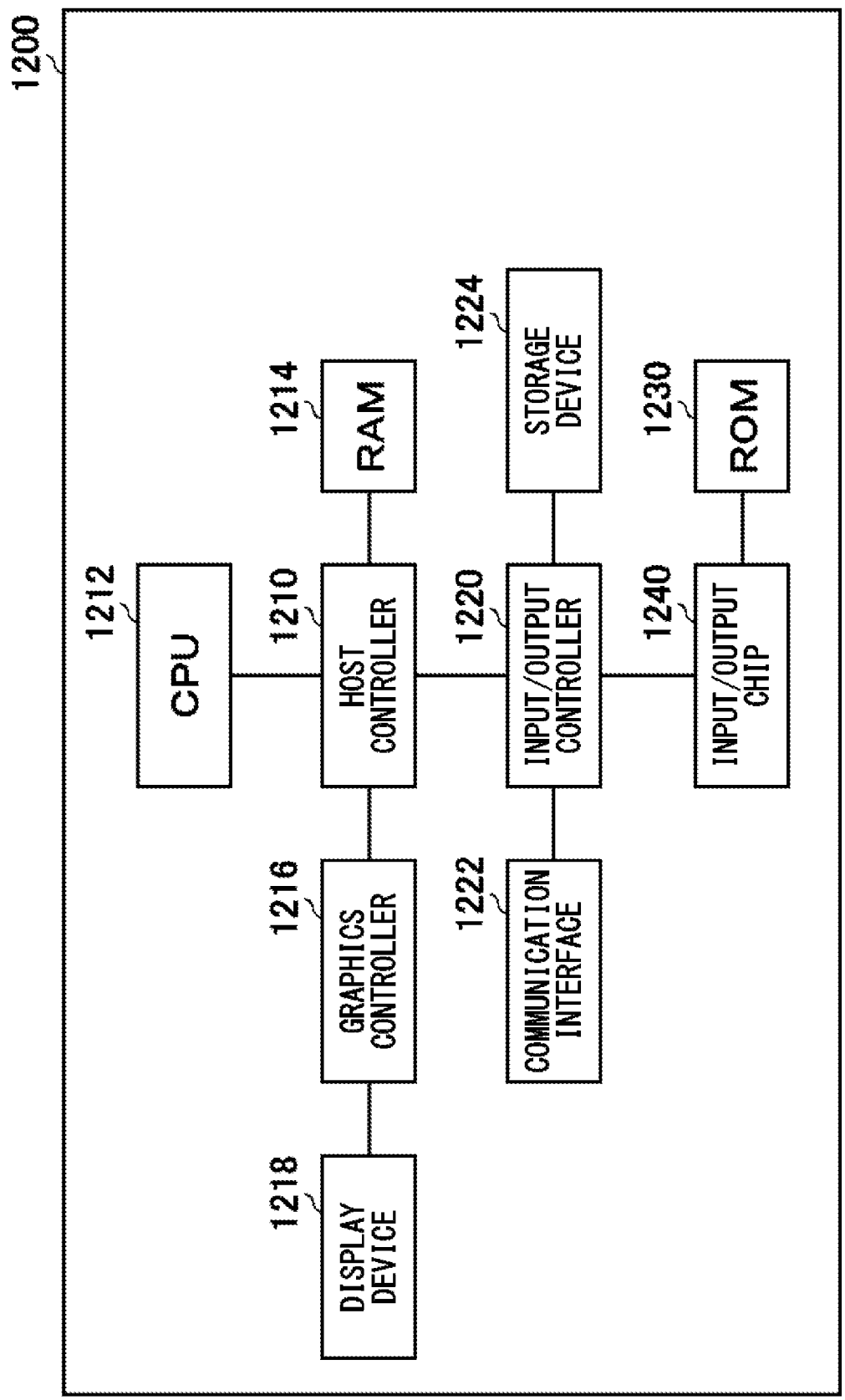
FIG. 8 schematically illustrates an example of a hardware configuration of a computer 1200 serving as the wireless base station 100 or the IoT device.

FIG. 8 schematically illustrates an example of a hardware configuration of a computer 1200 serving as the wireless base station 100, the IoT device 300 or the management apparatus 400. A program installed on the computer 1200 can cause the computer 1200 to serve as one or more "units" of apparatuses according to the above embodiments, or cause the computer 1200 to execute operations associated with the apparatuses according to the above embodiments or the one or more "units", and/or can cause the computer 1200 to execute the processes according to the above embodiments or steps of the processes. Such a program may be executed by the CPU 1212 to cause the computer 1200 to perform certain operations associated with some or all of the blocks of flow charts and block diagrams described herein.

The computer 1200 according to this embodiment includes a CPU 1212, a RAM 1214, and a graphics controller 1216, which are connected mutually by a host controller 1210. The computer 1200 also includes an input/output unit such as a communication interface 1222, a storage device 1224, and an IC card drive, which are connected to the host controller 1210 via an input/output controller 1220. The storage device 1224 may be a hard disk drive, a solid-state drive, and the like. The computer 1200 also includes a legacy input/output unit such as a ROM 1230 and a touch panel, which are connect to the input/output controller 1220 via an input/output chip 1240.

The CPU 1212 operates according to programs stored in the ROM 1230 and the RAM 1214, thereby controlling each unit. The graphics controller 1216 acquires image data generated by the CPU 1212 on a frame buffer or the like provided in the RAM 1214 or in itself, and causes the image data to be displayed on a display device 1218. The computer 1200 may not include the display device 1218, in which case the graphics controller 1216 causes the image data to be displayed on an external display device.

The communication interface 1222 communicates with other electronic devices via a wireless communication network. The storage device 1224 stores programs and data used by the CPU 1212 in the computer 1200. The IC card drive reads programs and data from an IC card and/or writes programs and data into the IC card.

The ROM 1230 stores therein a boot program or the like executed by the computer 1200 at the time of activation, and/or a program depending on the hardware of the computer 1200. The input/output chip 1240 may also connect various input/output units via a USB port and the like to the input/output controller 1220.

The programs are provided by a computer-readable storage medium such as an IC card. The programs are read from the computer-readable storage medium, installed into the storage device 1224, the RAM 1214, or the ROM 1230, which is also an example of the computer-readable storage medium, and executed by the CPU 1212. The information processing described in the programs is read into the computer 1200, resulting in cooperation between the programs and the above various types of hardware sources. An apparatus or method may be constituted by realizing the operation or processing of information in accordance with the use of the computer 1200.

For example, when communication is performed between the computer 1200 and an external device, the CPU 1212 may perform a communication program loaded onto the RAM 1214 to instruct, based on the processing described in the communication program, communication processing to the communication interface 1222. The communication interface 1222, reads, under control of the CPU 1212, transmission data stored in a transmission buffer region provided in a recording medium such as the RAM 1214, the storage device 1224, or the IC card, to transmit the read transmission data to the network, or writes reception data received from the network into a reception buffer region or the like provided onto the recording medium.

In addition, the CPU 1212 may cause the RAM 1214 to read all or necessary parts of files and database stored in the external recording medium such as the storage device 1224 or the IC card, and perform various types of processing on the data on the RAM 1214. Then, the CPU 1212 may write back the processed data to the external recording medium.

Various types of information, such as various types of programs, data, tables, and databases, may be stored in the recording medium to undergo information processing. The CPU 1212 may perform various types of processing on the data read from the RAM 1214, which includes various types of operations, information processing, condition judging, conditional branch, unconditional branch, search/replacement of information, etc., as described throughout this disclosure and specified by an instruction sequence of programs, and writes the result back to the RAM 1214. In addition, the CPU 1212 may search for information in a file, a database, etc., in the recording medium. For example, when a plurality of entries, each having an attribute value of a first attribute associated with an attribute value of a second attribute, are stored in the recording medium, the CPU 1212 may search for an entry matching the condition whose attribute value of the first attribute is specified, from among the plurality of entries, and read the attribute value of the second attribute stored in the entry, thereby acquiring the attribute value of the second attribute associated with the first attribute satisfying the predetermined condition.

The above-explained program or software modules may be stored in the computer-readable storage medium on or near the computer 1200. In addition, a recording medium such as a hard disk or a RAM provided in a server system connected to a dedicated communication network or the Internet can be used as the computer-readable storage medium, thereby providing the program to the computer 1200 via the network.

Blocks in flow charts and block diagrams in the above embodiments may represent steps of processes in which operations are performed or units of apparatuses responsible for performing operations. Certain steps and units may be implemented by dedicated circuitry, programmable circuitry supplied with computer-readable instructions stored on computer-readable storage medium, and/or processors supplied with computer-readable instructions stored on computer-readable storage medium. Dedicated circuitry may include digital and/or analog hardware circuits and may include integrated circuits (IC) and/or discrete circuits. Programmable circuitry may include, for example, reconfigurable hardware circuits comprising logical AND, OR, XOR, NAND, NOR, and other logical operations, flip-flops, registers, and memory elements, such as field-programmable gate arrays (FPGA), programmable logic arrays (PLA), etc.

The computer-readable storage medium may include any tangible device that can store instructions for execution by a suitable device, such that the computer-readable storage medium having instructions stored therein comprises an article of manufacture including instructions which can be executed to create means for performing operations specified in the flow charts or block diagrams. Examples of the computer-readable storage medium may include an electronic storage medium, a magnetic storage medium, an optical storage medium, an electromagnetic storage medium, a semiconductor storage medium, etc. More specific examples of the computer-readable storage medium may include a floppy (registered trademark) disk, a diskette, a hard disk, a random access memory (RAM), a read-only memory (ROM), an erasable programmable read-only memory (EPROM or Flash memory), an electrically erasable programmable read-only memory (EEPROM), a static random access memory (SRAM), a compact disc read-only memory (CD-ROM), a digital versatile disc (DVD), a Blu-ray (registered trademark) disc, a memory stick, an integrated circuit card, etc.

Computer-readable instructions may include any of assembler instructions, instruction-set-architecture (ISA) instructions, machine instructions, machine dependent instructions, microcode, firmware instructions, state-setting data, or either source code or object code described in any combination of one or more programming languages, including an object oriented programming language such as Smalltalk, JAVA (registered trademark), C++, etc., and conventional procedural programming languages, such as the "C" programming language or similar programming languages.

Computer-readable instructions may be provided to a processor of a general purpose computer, special purpose computer, or other programmable data processing apparatus, or to programmable circuitry, locally or via a local area network (LAN), wide area network (WAN) such as the Internet, etc., so that the processor of the general purpose computer, special purpose computer, or other programmable data processing apparatus, or the programmable circuitry executes the computer-readable instructions to generate means for performing operations specified in the flow charts or block diagrams. Examples of processors include computer processors, processing units, microprocessors, digital signal processors, controllers, microcontrollers, etc.

While the present invention have been described by using the embodiments, the technical scope of the invention is not limited to the scope of the embodiments described above. It is apparent to persons skilled in the art that various alterations or improvements can be added to the embodiments described above. It is also apparent from the description of the claims that the embodiments added with such alterations or improvements can be included in the technical scope of the invention.

The operations, procedures, steps, and stages of each process performed by an apparatus, system, program, and method shown in the claims, the specification, or drawings can be performed in any order as long as the order is not indicated by "prior to," "before," or the like and as long as the output from a previous process is not used in a later process. Even if the process flow is described using phrases such as "first" or "next" in the claims, the specification, and drawings, it does not necessarily mean that the process must be performed in this order.

EXPLANATION OF REFERENCES

10: communication system, 20: network, 100: wireless base station, 110: core-side communicating unit, 120: communication-apparatus-side communicating unit, 130: condition-storing unit, 132: condition-determining unit, 134: regulatory-signal informing unit, 150: to-be-regulated-item table, 200: communication terminal, 300: IoT device, 302: information-acquiring unit, 304: information-storing unit, 306: information-transmitting unit, 308: signal-acquiring unit, 310: communication-controlling unit, 400: management apparatus, 402: condition-storing unit, 404: condition-determining unit, 406: base-station selecting unit, 408: base-station controlling unit, 1200: computer, 1210: host controller, 1212: CPU, 1214: RAM, 1216: graphics controller, 1218: display device, 1220: input/output controller, 1222: communication interface, 1224: storage device, 1230: ROM, 1240: input/output chip

What is claimed is:

1. A communication system comprising:
a wireless base station; and
a communication apparatus capable of wirelessly communicating with the wireless base station;
wherein the wireless base station comprises:
a regulatory-signal informing unit that informs the communication apparatus of type information indicating a type of communication apparatus and a regulatory signal for restricting transmission to the wireless base station, in response to a predetermined condition being satisfied; and
wherein the communication apparatus comprises:
a communication-controlling unit that restricts transmission to the wireless base station based on the regulatory signal, when the type of the communication apparatus and the type indicated by the type information are matched.

2. The communication system according to claim 1, wherein the regulatory-signal informing unit informs the communication apparatus of the type information and the regulatory signal by including the type information and the regulatory signal in broadcasting information that the wireless base station periodically transmits.

3. The communication system according to claim 1, wherein the type information indicates a type of communication apparatus based on a corresponding function.

4. The communication system according to claim 1, wherein the type information is information indicating a specific electronic device.

5. The communication system according to claim 4, wherein the specific electronic device is a device without a user interface for starting transmission to the wireless base station.

6. The communication system according to claim 4, wherein the specific electronic device is a device to transmit information to a predetermined destination via the wireless base station, according to a predetermined transmission schedule.

7. The communication system according to claim 6, wherein the specific electronic device is a device comprising an information-storing unit storing the information when being unable to transmit information to the wireless base station.

8. The communication system according to claim 4, wherein the specific electronic device is an IoT (Internet of Things) device.

9. The communication system according to claim 1, wherein the predetermined condition is a condition satisfied when a disaster occurs.

10. The communication system according to claim 1, wherein in response to any of a plurality of conditions being satisfied, the regulatory-signal informing unit informs the communication apparatus, of the type information indicating the type of communication apparatus corresponding to the satisfied condition and the regulatory signal.

11. The communication system according to claim 1, wherein the regulatory-signal informing unit informs the communication apparatus of the type information, the regulatory signal, and area information indicating a target area in which transmission to the wireless base station is to be restricted;
wherein the communication-controlling unit restricts transmission to the wireless base station based on the regulatory signal, when the type of the communication apparatus and the type indicated by the type information are matched and when the communication apparatus is located in the area indicated by the area information.

12. A method performed by a wireless base station, the method comprising:
a regulatory-signal informing step of informing a communication apparatus, by the wireless base station, of type information indicating a type of communication apparatus and a regulatory signal for restricting transmission to the wireless base station, in response to a predetermined condition being satisfied.

13. The method according to claim 12, wherein the communication apparatus has a type and wherein the communication apparatus comprises a communication-controlling unit, the method further comprising:
restricting transmission to the wireless base station by the communication-controlling unit based on the regulatory signal, when the type of the communication apparatus and the type indicated by the type information are matched.

14. A management apparatus for managing a plurality of wireless base stations, the management apparatus comprising:
a base-station selecting unit for selecting one or more wireless base stations from among the plurality of wireless base stations, when a predetermined condition is satisfied, depending on the satisfied condition; and
a base-station controlling unit for causing the one or more wireless base stations selected by the base-station selecting unit to inform a communication apparatus of type information indicating a type of communication apparatus and a regulatory signal for restricting transmission to the wireless base station.

* * * * *